United States Patent
Brew et al.

(10) Patent No.: US 10,818,976 B2
(45) Date of Patent: Oct. 27, 2020

(54) RECHARGEABLE BATTERY

(71) Applicant: International Business Machines Corporation, Armonk, NY (US)

(72) Inventors: Kevin W. Brew, White Plains, NY (US); Oki Gunawan, Westwood, NY (US); Singh Saurabh, Albany, NY (US); Teodor K. Todorov, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 634 days.

(21) Appl. No.: 15/196,800

(22) Filed: Jun. 29, 2016

(65) Prior Publication Data

US 2018/0006333 A1 Jan. 4, 2018

(51) Int. Cl.
| | |
|---|---|
| *H01M 10/00* | (2006.01) |
| *H01M 10/0585* | (2010.01) |
| *H01M 10/0525* | (2010.01) |
| *H01M 4/66* | (2006.01) |
| *H01M 4/131* | (2010.01) |
| *H01M 10/0562* | (2010.01) |
| *H01M 4/136* | (2010.01) |

(52) U.S. Cl.
CPC ....... *H01M 10/0585* (2013.01); *H01M 4/131* (2013.01); *H01M 4/136* (2013.01); *H01M 4/66* (2013.01); *H01M 10/0525* (2013.01); *H01M 10/0562* (2013.01)

(58) Field of Classification Search
CPC ......... H01M 10/0585; H01M 10/0525; H01M 10/0562; H01M 4/136; H01M 4/66

USPC ........................................................ 429/162
See application file for complete search history.

(56) References Cited

U.S. PATENT DOCUMENTS

| | | | |
|---|---|---|---|
| 7,008,608 B2 | 3/2006 | Park et al. | |
| 8,197,970 B2 | 6/2012 | Kanda et al. | |
| 8,263,262 B2 | 9/2012 | Kim et al. | |
| 8,610,404 B2 | 12/2013 | Reefman et al. | |
| 8,734,994 B2 | 5/2014 | Park et al. | |
| 9,088,045 B2 | 7/2015 | Park et al. | |
| 9,203,109 B2 | 12/2015 | Hu et al. | |
| 9,327,990 B2 | 5/2016 | Balaya et al. | |
| 2002/0187399 A1* | 12/2002 | Johnson | H01M 4/661 429/245 |

(Continued)

FOREIGN PATENT DOCUMENTS

| | | |
|---|---|---|
| CN | 1808747 A | 7/2006 |
| CN | 102856552 B | 11/2015 |
| JP | 2011192414 A | 9/2011 |

OTHER PUBLICATIONS

Oudenhoven et al.; "All-Solod State Lithium-Ion Microbatteries: A Review of Various Three-Dimensional Concepts"; Advanced Energy Materials; 2011, 1; pp. 10-33.

*Primary Examiner* — Cynthia H Kelly
*Assistant Examiner* — Monique M Wills
(74) *Attorney, Agent, or Firm* — Cantor Colburn LLP

(57) ABSTRACT

A lithium rechargeable lithium battery including a conductive substrate, a cathode material layer disposed over the conductive substrate, a solid electrolyte material layer disposed over the cathode material layer, an anode material layer disposed over the solid electrolyte material layer, and a conductive layer disposed over the anode material layer.

8 Claims, 3 Drawing Sheets

(56) References Cited

U.S. PATENT DOCUMENTS

| | | |
|---|---|---|
| 2010/0248038 A1* | 9/2010 | Takami ................. H01M 4/364 |
| | | 429/332 |
| 2013/0260250 A1* | 10/2013 | Yada ..................... H01G 11/50 |
| | | 429/223 |
| 2014/0099251 A1 | 4/2014 | Kang et al. |
| 2015/0162609 A1 | 6/2015 | Kim et al. |
| 2015/0171431 A1* | 6/2015 | Yamada .................. H01M 4/70 |
| | | 429/163 |
| 2015/0303459 A1 | 10/2015 | Kovalenko et al. |
| 2015/0380763 A1* | 12/2015 | Ohtomo ................ H01M 4/382 |
| | | 429/304 |
| 2016/0087306 A1* | 3/2016 | Lee ................... H01M 10/0565 |
| | | 429/317 |
| 2016/0093884 A1 | 3/2016 | Cui et al. |
| 2016/0093915 A1 | 3/2016 | Yamamoto et al. |
| 2016/0190592 A1* | 6/2016 | Ochiai .................. H01M 4/622 |
| | | 429/217 |

\* cited by examiner

RECHARGEABLE BATTERY

BACKGROUND

The present invention generally relates to an improved rechargeable battery and a method of making the same.

Lithium metal and organic electrolytes used in the state-of-the-art commercial rechargeable batteries are prone to violent reactions with air and water. Lithium metal is so reactive that even nitrogen atmosphere is insufficient for handling it. Indeed, all operations including the lithium metal require a very expensive nitrogen environment.

SUMMARY

Embodiments provide a lithium rechargeable lithium battery including a conductive substrate, a cathode material layer disposed over the conductive substrate, a solid electrolyte material layer disposed over the cathode material layer, an anode material layer disposed over the solid electrolyte material layer, and a conductive layer disposed over the anode material layer.

Other embodiments provide a solution-processed method of manufacturing a lithium rechargeable lithium battery. According to the method, a conductive substrate is provided, a cathode material solution is coated over the conductive substrate to provide a cathode material layer, an electrolyte material solution is coated over the cathode material layer to provide an electrolyte material layer, and an anode material solution is coated over the electrolyte material layer to provide an anode material layer. The conductive substrate, the cathode material layer, the solid electrolyte material layer, and the anode material layer are further annealed to provide a four-layer structure. A conductive layer is then disposed over the anode material layer of the four-layer structure.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

Reference is made below to the above-described drawings, which are not drawn to scale for ease of understanding, wherein the same reference numbers used throughout different figures designate the same or similar components.

DETAILED DESCRIPTION

Figure 1:
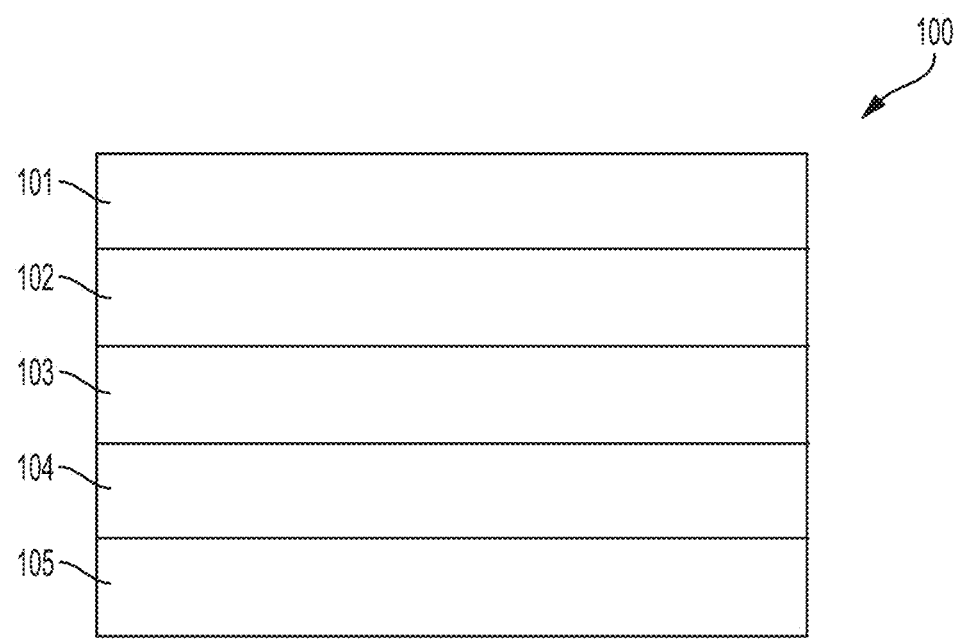
FIG. 1 depicts an embodiment of a rechargeable battery, in accordance with one or more aspects of the present invention.

Aspects of the present invention and certain features, advantages, and details thereof, are explained more fully below with reference to the non-limiting embodiments illustrated in the accompanying drawings. Descriptions of well-known materials, fabrication tools, processing techniques, etc., are omitted so as to not unnecessarily obscure the invention in detail. It should be understood, however, that the detailed description and the specific examples, while indicating embodiments of the invention, are given by way of illustration only, and are not by way of limitation. Various substitutions, modifications, additions and/or arrangements within the spirit and/or scope of the underlying invention will be apparent to those skilled in the art from this disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

As used herein, the terms "invention" or "present invention" are non-limiting terms and not intended to refer to any single aspect of the particular invention but encompass all possible aspects as described in the specification and the claims.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like. In one aspect, the term "about" means within 10% of the reported numerical value. In another aspect, the term "about" means within 5% of the reported numerical value. Yet, in another aspect, the term "about" means within 10, 9, 8, 7, 6, 5, 4, 3, 2, or 1% of the reported numerical value.

It will also be understood that when an element, such as a layer, region, or substrate is referred to as being "on" or "over" another element, it can be directly on the other element or intervening elements may also be present. In contrast, when an element is referred to as being "directly on" or "directly over" another element, there are no intervening elements present, and the element is in contact with another element.

It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As previously noted herein, lithium metal and organic electrolytes used in the state-of-the-art commercial rechargeable batteries are prone to undesired and potentially combustive reactions with air and water. Lithium metal is so reactive that even a nitrogen atmosphere does not sufficiently mitigate undesired reactions. An argon environment performs better than nitrogen but is extremely expensive.

The pursuit of environmentally-friendly lithium-ion battery has resulted in the development of multiple oxide materials for fabrication of cathodes (e.g. $Li_xCoO_2$, $Li_xNi_2O_2$), electrolytes (e.g. $LiNbO_3$), and anodes (e.g. $Li_xTi_5O_{12}$). Most of these fabrication approaches include bulk synthesis or vacuum depositions techniques.

Turning now to an overview of the present invention, embodiments provide improved rechargeable battery structures and a method of making the same. Embodiments of the invention provide an integrated solid state lithium-ion battery that is environmentally stable, mitigates undesired and potentially combustive reactions with air and water, and is easy to fabricate. In one or more embodiments, the disclosed rechargeable battery comprises a conductive substrate, a cathode material, an electrolyte material, an anode material, and a conductive layer. In one or more embodiments, the conductive substrate includes at least one of carbon, Ni, Co, Ti, Cr, V, Fe, Zn, Mn, W, Cu, doped SnO, doped ZnO, doped $In_2O_3$. In one or more embodiments, the cathode material includes at least one of $LiCoO_2$, $Li_xNi_2O_2$, and other similar materials. In one or more embodiments, the electrolyte material includes $LiNbO^3$ and other similar materials. In one or more embodiments, the anode material includes at least one of $TiO_2$, $Li_xTi_5O_{12}$, SnO, and other similar materials. In one or more embodiments, the conductive layer includes carbon, metal or a conductive oxide.

Turning now to a more detailed description the present invention, FIG. 1 depicts a rechargeable lithium battery 100 according to one or more embodiments. The rechargeable lithium battery 100 includes a conductive substrate 101 and a cathode material layer 102 disposed on the conductive substrate 101. The substrate 101 can be any substrate known in the art, which is suitable for the lithium battery and can include materials such as carbon (C), nickel (Ni), cobalt (Co), titanium (Ti), chromium (Cr), vanadium (V), iron (Fe), zinc (Zn), magnesium (Mn), tungsten (W), copper (Cu), tin oxide (SnO), zinc oxide (ZnO), or indium oxide ($In_2O_3$). Two or more of the above materials can be used, when desired.

The cathode material layer 102 includes a lithium composite oxide, for example, $LiCoO_2$, $LiNiO_2$, $LiNi_2O_2$, $LiMn_2O_4$, $Li_2MnO_3$, $LiFePO_4$, $Li_2FeP_2O_7$, $LiMnPO_4$, $LiFeBO_3$, $LiV_2(PO_4)_3$, $Li_2CuO_2$, $LiFeF_3$, $Li_2FeSiO_4$, $Li_2FeSiO_4$, or a combination thereof. In embodiments, the cathode material layer includes $LiCoO_2$. However, the materials for manufacturing the cathode material layer are not limited thereto, and any material known in the art, which is suitable for functioning as a cathode in a lithium battery, can be used.

The rechargeable lithium battery further includes a solid electrolyte material layer 103, which is disposed on the cathode material layer 102. The solid electrolyte material comprises $Li_xLa_{(2-x)/3}TiO_3$ (wherein $0.1 \leq x \leq 0.5$), $Li_{7+x}La_3Zr_2O_{12+(x/2)}$ (wherein $-5 \leq x \leq 3$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $Li_{1.4}In_{0.4}Ti_{1.6}(PO_4)_3$, $LiTaO_3$, $LiNbO_3$, or a combination thereof. In embodiments, the solid electrolyte material layer includes $LiNbO_3$. However, the materials for manufacturing the electrolyte material layer are not limited thereto, so any solid material known in the art, which can serve as an electrolyte in a lithium battery, can be used.

The ion conductivity of the solid electrolyte material can be $1 \times 10^{-5}$ siemens per centimeter or greater, for example, $3 \times 10^{-5}$ siemens per centimeter or greater, or $5 \times 10^{-5}$ siemens per centimeter or greater.

The rechargeable lithium battery further includes an anode material layer 104 disposed on the solid electrolyte material layer 103. The anode material layer can include $TiO_x$ (wherein $0 \leq x \leq 2$), $Li_xTi_5O_{12}$, $Li_2Ti_3O_7$, SnO, or a combination thereof. In embodiments, the anode material layer includes $TiO_2$. However, the materials for manufacturing the anode material layer are not limited thereto, so any material known in the art, which is suitable for functioning as an anode in a lithium battery, can be used.

The rechargeable lithium battery further includes a conductive layer 105 disposed on the anode material layer 104. The conductive layer can include carbon (C), a metal, a metal alloy, or a conductive oxide. The metal can be copper (Cu), magnesium (Mg), titanium (Ti), iron (Fe), cobalt (Co), nickel (Ni), zinc (Zn), aluminum (Al), germanium (Ge), indium (In), gold (Au), platinum (Pt), silver (Ag), or palladium (Pd). The conductive oxide can include aluminum (Al), titanium (Ti), cobalt (Co), magnesium (Mg), calcium (Ca), potassium (K), sodium (Na), boron (B), strontium (Sr), barium (Ba), manganese (Mn), nickel (Ni), vanadium (V), iron (Fe), copper (Cu), phosphorus (P), scandium (Sc), zirconium (Zr), niobium (Nb), chromium (Cr), molybdenum (Mo), or a combination thereof. Two or more of the above materials can be used, when desired.

Each of the conductive substrate 101, the cathode material layer 102, the solid electrolyte material layer 103, the anode material layer 104, and the conductive layer 105 can have a thickness in a range of from about 50 nanometers (nm) to about 100 micrometers (μm), for example, from about 100 nm to about 1 μm, or from about 200 nm to about 500 nm. In some embodiments, the anode has an average thickness of less than about 100 μm, less than about 1 μm, less than about 500 nm, less than about 200 nm, less than about 100 nm, or less than 50 nm.

The total thickness of the conductive substrate, the cathode material layer, the solid electrolyte material layer, the anode material layer, and the conductive layer (collectively—"active layers") can be about 100 nm to about 5 μm, for example, about 1 μm to about 5 μm. In embodiments, the thickness of the above layers can be about 2 μm.

The five active layers can be deposited in a reverse order.

The rechargeable battery can have a specific energy of about 2 watt hours per kilogram (Wh/kg) or greater, for example, about 5 Wh/kg.

The present invention further provides a solution-processed method of fabricating a lithium rechargeable lithium battery, including:

providing a conductive substrate;

coating a cathode material solution on the conductive substrate to provide a cathode material layer;

coating an electrolyte material solution on the cathode material layer to provide an electrolyte material layer;

coating an anode material solution on the electrolyte material layer to provide an anode material layer;

annealing the conductive substrate, the cathode material layer, the solid electrolyte material layer; and the anode material layer to provide a four-layer structure; and disposing a conductive layer on the anode material layer of the four-layer structure.

In the above method, each coating can be performed at a rate of about 300 revolutions per minute (rpm) to about 2,000 rpm, for example, about 600 rpm to about 1,000 rpm.

The temperature of the annealing can range from about 300° C. to about 600° C., for example, from about 500° C. to about 550° C.

In embodiments, a cathode material solution, an electrolyte material solution, and an anode material solution are prepared and sequentially coated on the conductive substrate. The cathode material solution can include a lithium (Li) salt, a cobalt (Co) salt, and a solvent. The electrolyte material solution can include a lithium (Li) salt, a niobium (Nb) salt, and a solvent. The anode material solution can include a lithium (Li) salt, a titanium (Ti) salt, and a solvent.

The solvent can be water or any organic solvent in which the salts forming the cathode material solution, the electrolyte material solution, or the anode material solution can be dissolved. For example, the solvent can be water, an alcohol, an ether, a ketone, an ester, a nitrile, a bipolar aprotic solvent such as dimethylsulfoxide, N,N-dimethylformamide, N-methyl-2-pyrrolidone, a combination of any two or more of the above solvents, but is not limited thereto. In embodiments, the solvent can be an alcohol, for example, methanol, ethanol, or iso-propanol.

In embodiments, the lithium (Li) salt can include lithium acetate, the cobalt (Co) salt can include anhydrous cobalt nitrate or cobalt nitrate hexahydrate, the niobium salt (Nb) can include niobium ethoxide, the titanium (Ti) salt can include titanium isopropoxide, and the alcohol can include ethanol.

In Example 1 of the present invention, the cathode material solution is prepared by mixing lithium acetate (0.08 g) and cobalt nitrate hexahydrate (0.291 g) in 3 mL of ethanol. The electrolyte material solution is prepared by mixing lithium acetate (0.08 g) and niobium ethoxide (0.318 g) in 3 mL of ethanol. The anode material solution is prepared by mixing lithium acetate (0.494 g) and titanium isopropoxide (1 mL) in 5 mL of ethanol.

Four layers of each solution are spin coated on a nickel foil (industrial grade) in air at 1,000 rpm and annealed on a hot plate for 1 minute at 540° C. Samples with the same processing are fabricated also on electro-plated Ni on copper foil and e-beam evaporated Ni on silicon substrate and transferred to the glove box for characterization.

The samples are activated by depositing a drop of $LiPF_6$ electrolyte on top of the sample, wiping the excess with filter paper and annealing at 140° C. for 2 minutes to remove any solvent. A piece of indium metal is pressed on top forming a device with area about 0.05 square centimeters ($cm^2$).

Figure 2:
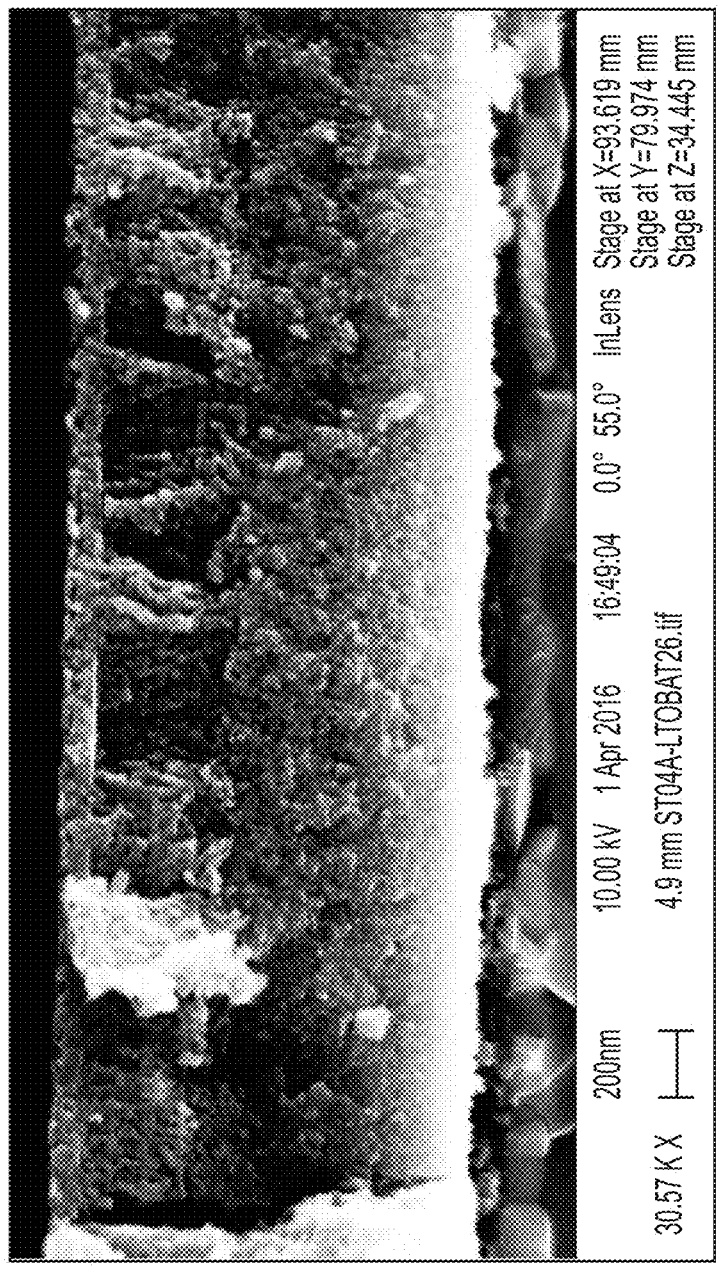
FIG. 2 is a scanning electron micrograph of a rechargeable battery fabricated according to Example 1 disclosed herein.

FIG. 2 is a scanning electron micrograph of the enhanced safety rechargeable battery manufactured according to Example 1, which is fabricated on 1.5 inch diameter, about 500 μm thick n-doped P—Si wafer. The active layer consists of four layers of $LiCoO_2$, four layers of $LiNbO_2$, and four layers of $Li_4Ti_5O_{12}$. Each layer is spun cast at 1,000 rpm and baked at 540° C. for 1-2 minutes between coatings. The total thickness of the active layer was found to be 1.4 μm.

Figure 3:
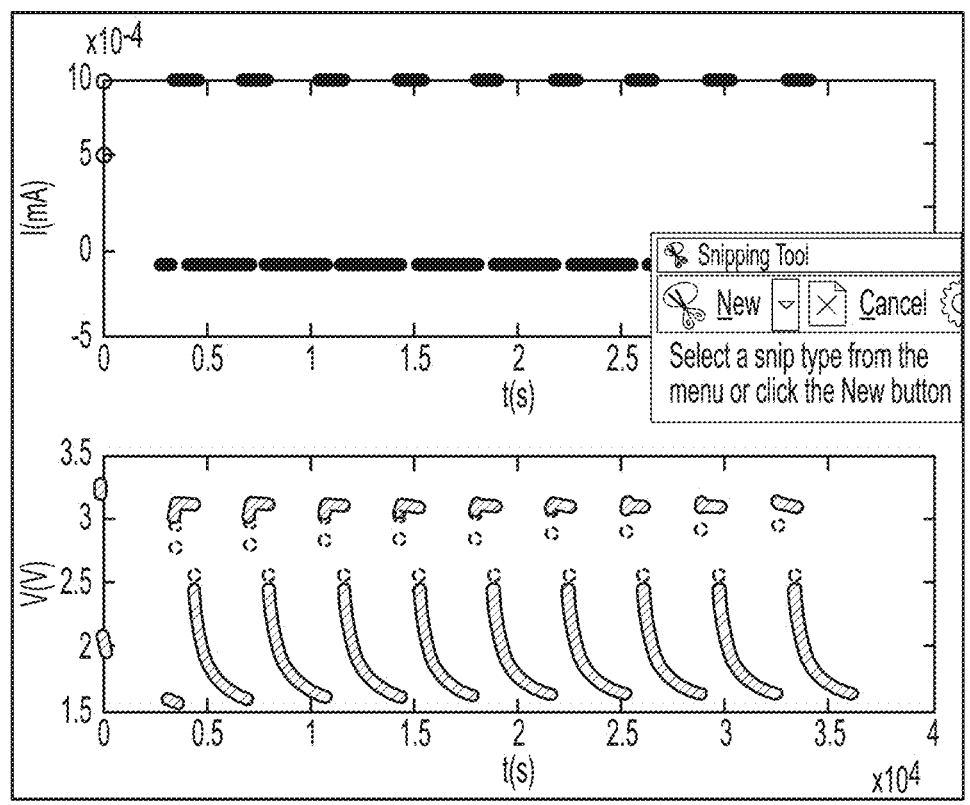
FIG. 3 is a graph of current (milliamperes, mA) and voltage (volts, V) versus time (seconds, s) illustrating cyclic performance of the rechargeable battery fabricated according to Example 1 disclosed herein.

FIG. 3 is a graph of current (milliamperes, mA) and voltage (volts, V) versus time (seconds, s) illustrating cyclic performance of the enhanced safety rechargeable battery manufactured according to Example 1. Cycling of the battery at a specific energy of about 2 watt hours per kilogram (Wh/kg) was: 1 hour (h) cycle of which 25% charging at 20 nanoamperes per square centimeter ($nA/cm^2$), 75% discharging at 2 $nA/cm^2$.

Thus, the above described method provides the novel fabrication of subsequent thin films simultaneously on a substrate.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A rechargeable lithium battery comprising:
   a conductive substrate;
   a cathode material layer disposed over the conductive substrate;
   a solid electrolyte material layer disposed over the cathode material layer, wherein the solid electrolyte material comprises $Li_xLa_{(2-x)/3}TiO_3$ (wherein $0.1 \leq x \leq 0.5$), $Li_{7+x}La_3Zr_2O_{12+(x/2)}$ (wherein $-5 \leq x \leq 3$), $Li_4Ti_5O_{12}$, $Li_{3.6}Si_{0.6}P_{0.4}O_4$, $Li_{1.3}Al_{0.3}Ti_{1.7}(PO_4)_3$, $Li_{1.8}Cr_{0.8}Ti_{1.2}(PO_4)_3$, $Li_{1.4}In_{0.4}Ti_{1.6}(PO_4)_3$, $LiTaO_3$, $LiNbO_3$, or a combination thereof and further wherein an ion conductivity of the solid electrolyte material is $1 \times 10^{-5}$ siemens per centimeter or greater;
   an anode material layer disposed over the solid electrolyte material layer, wherein the anode material layer comprises $Li_2Ti_3O_7$; and
   a conductive layer disposed over the anode material layer.

2. The rechargeable lithium battery of claim 1, wherein the conductive substrate comprises cobalt (Co), titanium (Ti), chromium (Cr), vanadium (V), zinc (Zn), magnesium (Mn), tungsten (W), copper (Cu), tin oxide (SnO), zinc oxide (ZnO), indium oxide ($In_2O_3$), or a combination thereof.

3. The rechargeable lithium battery of claim 1, wherein the cathode material comprises a lithium composite oxide.

4. The rechargeable lithium battery of claim 3, wherein the lithium composite oxide is $LiCoO_2$, $LiNiO_2$, $LiNi_2O_2$, $LiMn_2O_4$, $Li_2FeP_2O_7$, $LiFeBO_3$, $LiV_2(PO_4)_3$, $Li_2CuO_2$, $LiFeF_3$, $Li_2FeSiO_4$, $Li_2FeSiO_4$, or a combination thereof.

5. The rechargeable lithium battery of claim 1, wherein the conductive layer comprises a metal, a metal alloy, or a conductive oxide.

6. The rechargeable lithium battery of claim 5, wherein the metal is magnesium (Mg), titanium (Ti), iron (Fe), cobalt (Co), zinc (Zn), aluminum (Al), germanium (Ge), indium (In), gold (Au), platinum (Pt), silver (Ag), or palladium (Pd).

7. The rechargeable lithium battery of claim 1, wherein a total thickness of the cathode material layer, the solid electrolyte material layer, the anode material layer, and the conductive layer is about 2 micrometers.

8. The rechargeable lithium battery of claim 1, wherein the battery has a specific energy of about 2 watt hours per kilogram or greater.

* * * * *